(12) United States Patent
Howard

(10) Patent No.: US 12,104,601 B2
(45) Date of Patent: *Oct. 1, 2024

(54) IMPELLER SENSOR FOR FLUID PUMP

(71) Applicant: Dean Richard Howard, Runaway Bay (AU)

(72) Inventor: Dean Richard Howard, Runaway Bay (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,436

(22) Filed: Jun. 20, 2023

(65) Prior Publication Data

US 2023/0366404 A1 Nov. 16, 2023

Related U.S. Application Data

(63) Continuation of application No. 16/897,214, filed on Jun. 9, 2020, now Pat. No. 11,680,569.

(51) Int. Cl.
*F04D 13/06* (2006.01)
*F04D 15/00* (2006.01)
*H02H 7/08* (2006.01)

(52) U.S. Cl.
CPC ......... *F04D 13/06* (2013.01); *F04D 15/0088* (2013.01); *H02H 7/08* (2013.01)

(58) Field of Classification Search
CPC ....... H02H 7/08; F04D 13/06; F04D 15/0088; F04D 29/181; F04D 15/0077; F04B 49/02; G01R 31/00; G01R 31/34
USPC ......................................................... 361/25
See application file for complete search history.

(56) References Cited

U.S. PATENT DOCUMENTS

| | | | |
|---|---|---|---|
| 5,324,170 A | 6/1994 | Anastos et al. | |
| 6,174,146 B1 | 1/2001 | Lacy et al. | |
| 7,866,942 B2 | 1/2011 | Harvie | |
| 8,739,724 B2 | 6/2014 | Howard | |
| 10,677,248 B2 | 6/2020 | Howard | |

*Primary Examiner* — Charles G Freay
*Assistant Examiner* — Lilya Pekarskaya
(74) *Attorney, Agent, or Firm* — Puget Sound Patents; Dwayne E Rogge

(57) ABSTRACT

This disclosure describes electrically powered fluid (liquid) pumps having an electric motor or actuator attached to a power source with a power sensor configured to measure the power draw of the motor while the pump is operating.

9 Claims, 2 Drawing Sheets

IMPELLER SENSOR FOR FLUID PUMP

This application claims priority benefit of U.S. Ser. No. 16/897,214 filed on Jun. 9, 2020 which in turn claims priority benefit of U.S. Ser. No. 15/476,501, filed Mar. 31, 2017, each incorporated herein by reference.

U.S. application Ser. No. 15/476,501 claims priority benefit of U.S. Ser. No. 62/318,013, filed Apr. 4, 2016, also incorporated herein by reference.

BACKGROUND OF THE DISCLOSURE

Field of the Disclosure

This disclosure relates to the field of electrically powered fluid (liquid) pumps having an electric motor or actuator which is attached to a power source with a power sensor configured to measure the power draw of the motor while the pump is operating.

BRIEF SUMMARY OF THE DISCLOSURE

Disclosed herein is an impeller sensor for a (fluid impeller) pump. The pump optionally having an electric motor and an impeller for pumping of fluid. In one example, the sensor has positive and negative electric power input leads coupled to an electric power source such as household AC power, a motor-driven generator, a battery, solar cell, or other electric power source. The term "lead" is used herein to define an often flexible and insulated single conductor, as a wire, used in connections between pieces of electric apparatus.

The impeller sensor has a power sensor electrically coupled to the power input leads. The power sensor is configured to sense/detect/analyze the power draw of the impeller pump while the impeller pump is operating, and operate a switching circuit to selectively control power to the electric motor of the impeller pump.

Positive and negative power output leads are electrically coupled to, and provide motive power to the impeller pump.

A timer may also be provided. The timer configured to provide motive power to the impeller pump through the power output leads of the impeller sensor at a predetermined time interval.

Circuitry is provided, configured to continue motive power to the impeller pump through the power output leads when the power draw of the impeller pump sensed by the power sensor is above a first threshold; and the circuitry is configured to discontinue motive power to the impeller pump through the power output leads when the power draw of the impeller pump sensed by the power sensor falls below a second threshold.

The impeller sensor as recited above may be arranged wherein the timer is configured with: a first time interval; and a second time interval significantly longer than the first time interval. The circuitry may be configured to actuate the timer upon discontinuation of motive power to the impeller pump.

The circuitry of the impeller sensor may be configured to actuate the impeller pump upon passing of a first time interval if the power sensor did detect power draw of the impeller pump above the first threshold during the previous actuation of the impeller pump.

The impeller sensor as recited above may be arranged wherein the power sensor is mounted at a location remote from the impeller pump.

The impeller sensor as recited above may be arranged wherein the timer is mounted at a location remote from the impeller pump.

DETAILED DESCRIPTION OF THE DISCLOSURE

Disclosed herein is an impeller sensor used for controlling a liquid impeller pump having an electric motor and an impeller for pumping of liquid. The sensor indirectly measures the presence of fluid (liquid, often water or fuel) in a vessel to be pumped from, such as a boat, dry dock, etc. The sensor is used to determine the power draw of the pump, and then cease, or continue pumping of the liquid based on the power consumption of the pump, as compared to a baseline power consumption. For example, where the baseline is established via a dry pump, power consumption above a threshold over the baseline will result in continued actuation of the pump. In another example, where the baseline is established via a wet pump, power consumption below a threshold below the baseline will result in terminating actuation of the pump.

Figure 1:
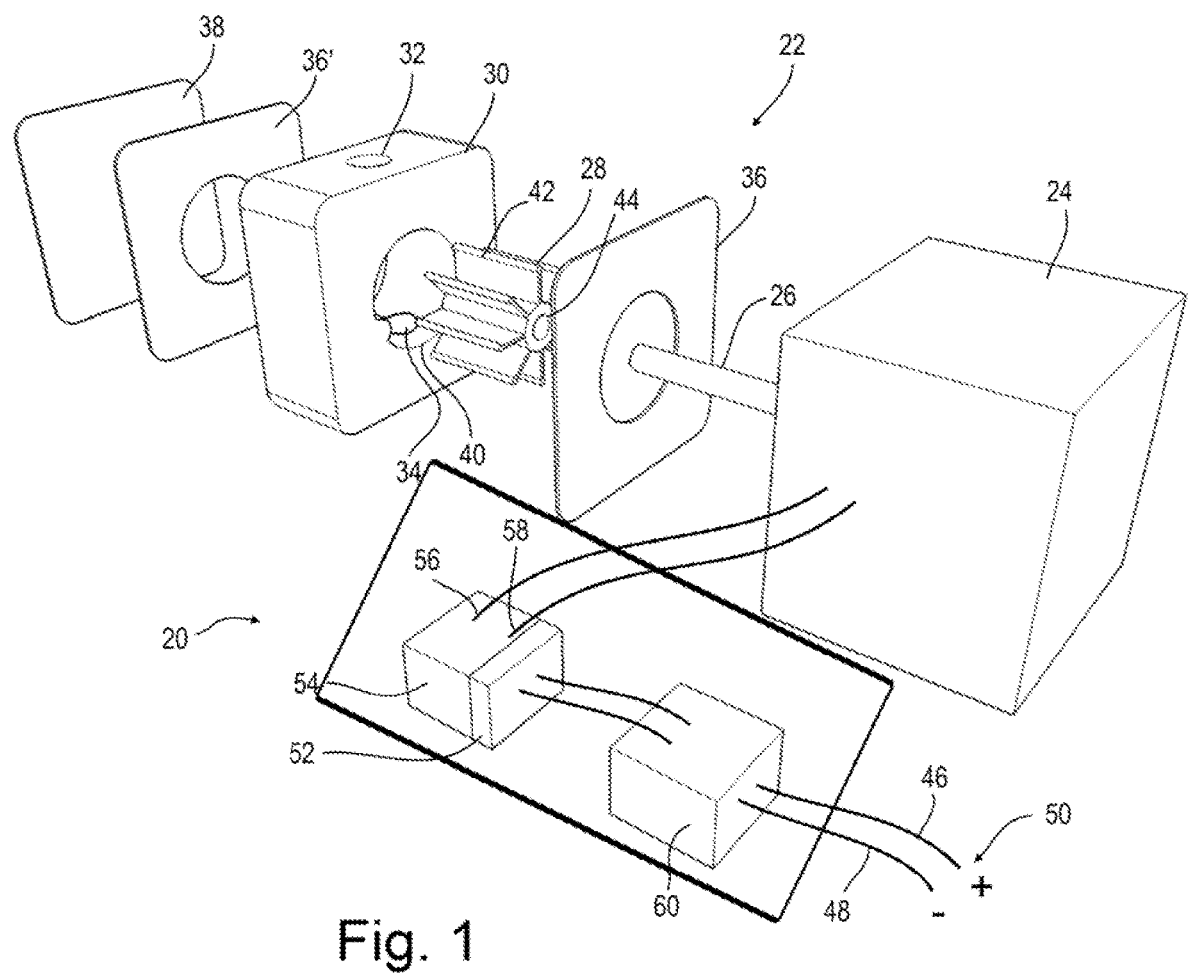
FIG. 1 is an exploded highly schematic view of one example of an impeller sensor for a liquid pump.
Figure 2:
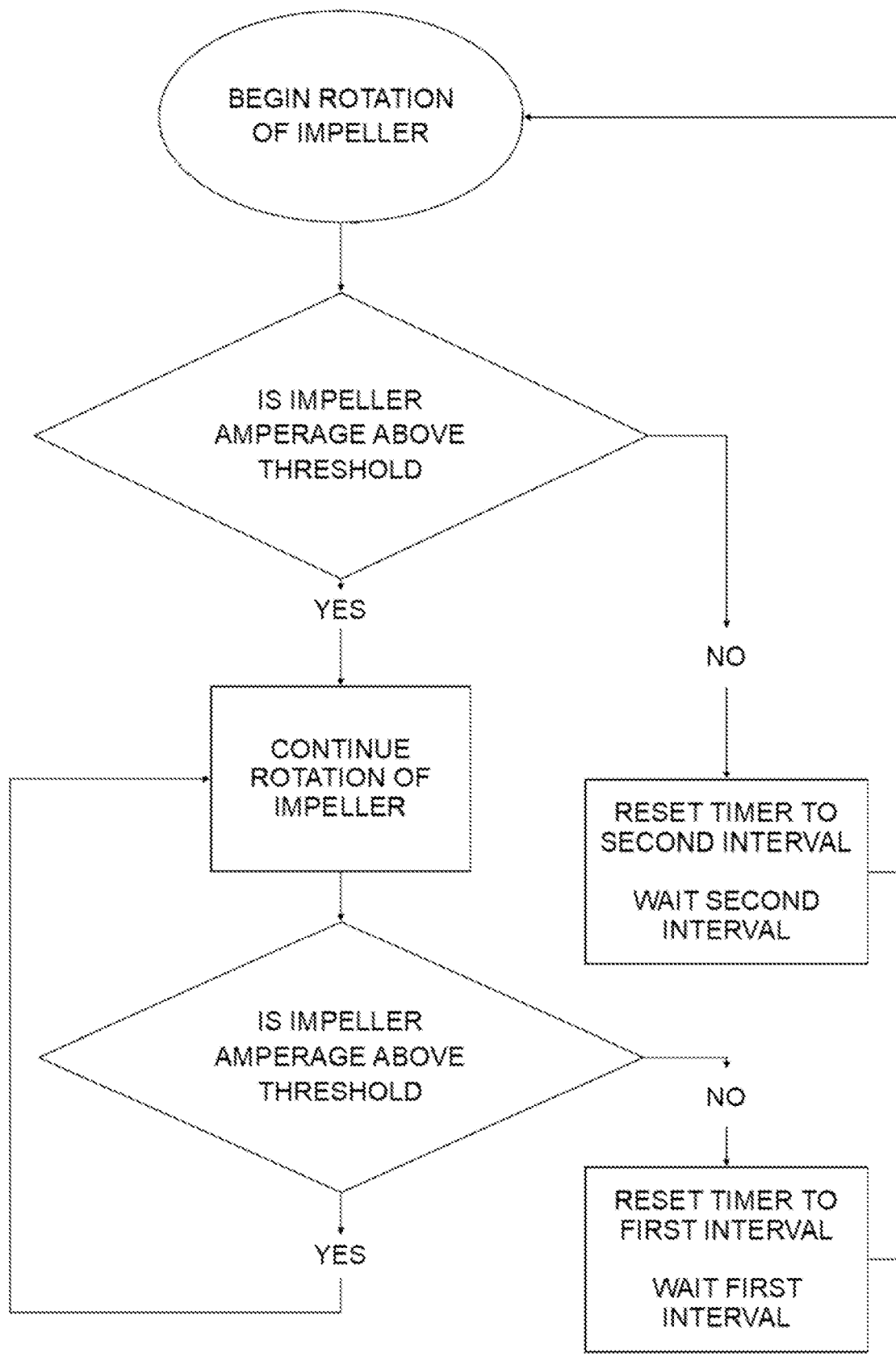
FIG. 2 is a process flow diagram of one example of the disclosed impeller sensor for a liquid pump system.

Looking to FIG. 1 is shown one example of the disclosed impeller sensor 20 electrically coupled to an impeller pump 22, although the sensor 20 may be used with other liquid pumps. In FIG. 1 is shown a highly schematic impeller pump 22, similar in function to prior known impeller pumps such as the impeller pumps disclosed in U.S. Pat. No. 7,866,942 incorporated herein by reference. An impeller is generally a rotating component of a pump, which transfers energy from a motor driving the impeller of the pump to the fluid (liquid or gas) being pumped. This is accomplished in some pumps by accelerating the fluid outwards from the center of rotation. The fluid velocity achieved by the impeller transfers into pressure when the outward movement of the fluid is confined by the pump housing. A detent on the inner surface of the pump housing may also compress the space defined by the surfaces and the vanes of the impeller, thus forcing fluid out of the outlet 34. Impellers are usually fitted into short cylinders within the housing, the cylinders having an open inlet to accept incoming fluid, vanes to push the fluid into an outlet, and a splined, keyed, or threaded bore to accept a drive-shaft connected to the motor. Impeller pump 22 shown in FIG. 1 comprises a drive motor 24 having a drive shaft 26 extending therefrom. The drive shaft 26 is coupled to an impeller 28 fitted within a pump housing 30 having an inlet 32 and an outlet 34. A gasket 36 or seal may be provided between the drive motor 24 and the pump housing 30 to more effectively fluid seal the gap there between. Similarly, a gasket 36 may be provided between the pump housing 30 and an end plate 38. In one form, the end plate 38, gasket 36, pump housing 30, and drive motor 24 are fixed together by way of fasteners as is well-known in the art.

As the impeller 28 rotates within an inner surface 40 of the pump housing 30, fluid is pumped from the inlet 32 and exits the outlet 34. As can be appreciated by one of ordinary skill in the art, the power consumption of the drive motor 24 can be expressed where the power equals the current flow times the voltage (P=IV). This power consumption is significantly different between an impeller 28 which is pumping air or other gasses and an impeller 28 which is pumping a fluid/liquid such as water or fuel. Thus, by determining a threshold power consumption difference between pumping of air (a dry impeller) and pumping of liquid (a wet impeller) the presence of pumping liquid in the pump housing 30 can be determined during operation (rotation) of the impeller 28.

Disclosed herein in one example is an impeller sensor 20 for a liquid impeller pump 22 to replace previously known float and pump combinations. The liquid impeller pump 22 having an electric (drive) motor 24 and an impeller 28 with vanes 42 extending radially from a hub 44. The impeller 28 is attached to the drive shaft 26 of the drive motor 24. The liquid impeller pump 22 is generally used for pumping of fluid, most commonly liquid. In one example, the impeller sensor has positive 46 and negative 48 electric power input leads coupled to an electric power source 50 such as household AC power, a motor-driven generator, a motor-driven alternator, a battery, power cell, solar cell, or other electric power source 50.

The impeller sensor 20 in one example has a power sensor 52 electrically coupled to the power input leads 46/48. The power sensor 52 is configured to sense/detect/analyze the power draw of the impeller pump drive motor 24 while the impeller pump drive motor 24 is operating, and subsequently send a control signal to a switching circuit 54 to selectively control power from the electric power source 50 to the electric (drive) motor 24 of the pump 22.

The impeller sensor 20 in one example is coupled to positive power output lead 56 and negative power output lead 58 which in turn are electrically coupled to, and provide motive power to the drive motor 24.

A timer 60 may also be provided electrically coupled to the power sensor 52 and switching circuit 54. The timer 60 is configured to periodically provide motive power to the drive motor 24 of the impeller pump 22. In one example electric motive power is provided to the drive motor 24 through the power output leads 56/58 of the impeller sensor 20 at a predetermined time interval.

To facilitate operation, circuitry within the impeller sensor 20 is provided, configured in one example to continue motive power to the impeller pump through the power output leads 56/58 when the amperage or voltage draw of the impeller pump drive motor 24 sensed by the power sensor 52 is above a first threshold. In this example, the circuitry is configured to discontinue motive power to the impeller pump through the power output leads when the power draw of the impeller pump sensed by the power sensor falls substantially below the first threshold. The circuitry may be configured to discontinue motive power to the impeller pump 22 through the power output leads 56/58 when the power draw of the impeller pump drive motor 243 sensed by the power sensor 52 falls below a second threshold, below the first threshold.

The impeller sensor 20 as recited above may be arranged wherein the timer 60 is configured with: a first time interval; and a second time interval significantly longer than the first time interval. For example, after a first interval (i.e. 5 minutes) the timer 60 provides motive power to the drive motor 24 for a short time duration, such as less than 5 seconds. In one example this is accomplished by actuating the switching circuit 54 for the short time duration. If during activation, the power sensor 52 detects a power draw above the first threshold power then the power sensor 52 will control the switching circuit 54 and maintain actuation of the drive motor 24 while the power draw is above the first threshold. The circuitry may be configured to actuate a wait sequence defined by the first time interval upon discontinuation of motive power to the impeller pump following a pumping cycle that determined the presence of liquid.

If actuation of the drive motor 24 for a short duration does not result in an a power draw above the first threshold power, then the wait sequence of the timer is reset so as to send motive power to the drive motor 24 after a wait sequence defined by a period of the second time interval.

In other terms, the impeller sensor will periodically energize the drive motor 24. If the power sensor 52 detects a power draw above the first threshold, then it will continue energizing the drive motor 24 until the power draw drops below a first threshold. If a second threshold is set (lower than the first threshold) then the impeller sensor 20 may continue energizing the drive motor 24 until the power draw falls below the first threshold, until the power draw drops below the second threshold.

Following actuation of the drive motor 24 and detection of power draw above the first threshold, it is concluded that liquid (often water) is present in the region (often the bilge, sump, or dry dock) from which liquid is pumped. Such liquid possibly indicating a leak, rain, or similar liquid entry. This subsequent actuation will be desired in a relatively short (first) interval. As it is mechanically and electrically detrimental to run such pumps continually, a period of down time is desired. In one range this first time interval is between one and twenty minutes.

Following actuation of the drive motor 24 without detection of power draw above the first threshold, it is concluded that liquid (often water) is not present in the region (often the bilge, sump, or dry dock) from which liquid is pumped. This subsequent actuation will be desired in a relatively long (second) interval. In one range this second time interval may be between twenty minutes and ten hours.

Again, the circuitry of the impeller sensor 20 may include a timer 60 configured to actuate the impeller pump upon passing of the first time interval, if the power sensor does detect power draw of the impeller pump above the first threshold during the previous actuation of the impeller pump.

Similarly, circuitry of the impeller sensor may include a timer 60 configured to actuate the impeller pump upon passing of second time interval (shorter than the first time interval) if the power sensor did detect power draw of the impeller pump above the first threshold during the previous actuation of the impeller pump.

The impeller sensor as recited above may be arranged wherein the power sensor 52 is mounted at a location remote from the impeller pump 22, as the impeller pump 22 is often positioned within a cavity such as a vessel bilge, sump, or dry dock.

One such environment in which this impeller sensor 20 is particularly suited is disclosed in U.S. Pat. No. 8,739,724 where the water pump (82) may comprise the drive motor 24 with impeller pump 22. In this example and others, the cavity (62) into which the impeller pump 22 is placed is often at least partially filled with water, and nearly never fully dry. Previously, a float switch is often placed in the cavity with the water pump (82). As the liquid (water) level rises in the cavity (62) the float switch activates the pump and the water level drops. The sensor of these previous configurations is electrically, and often mechanically coupled to the pump (82) and thus is susceptible to deterioration due to wet conditions and electrolysis.

Such wet and damp conditions are very detrimental to the electrical components of the impeller sensor 20 including the power sensor 52, switching circuit 54, and timer 60.

Thus, it is often beneficial to provide the power sensor 52, switching circuit 54, and/or timer 60 exterior of the cavity from which liquid is to be pumped to deduce deterioration effects.

In one form, each of the power sensor 52, switching circuit 54, and/or timer 60 may be provided in a watertight housing 64. In one example, each may be provided on the same circuit board and encapsulated in a watertight housing with leads 46/48 and 56/58 being the only extensions through the housing.

The impeller sensor 20 as recited above may be arranged wherein the timer 60, power sensor 52, and switching circuit 54 are each mounted at locations remote from the impeller pump 22.

While the present invention is illustrated by description of several embodiments and while the illustrative embodiments are described in detail, it is not the intention of the applicants to restrict or in any way limit the scope of the appended claims to such detail, additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicant's general concept.

The invention claimed is:

1. An impeller sensor for a liquid pump comprising:
    an electric power source;
    the electric power source electrically coupled to and configured to providing a motive power to the liquid pump;
    a power sensor coupled to the electric power source, the power sensor configured to sense a power draw of the liquid pump while the liquid pump is operating during a pumping cycle;
    a timer configured to provide the motive power to the liquid pump;
    a circuitry configured to continue the motive power to the liquid pump, when the power draw of the liquid pump sensed by the power sensor is above a first threshold;
    the circuitry configured to discontinue the motive power to the liquid pump, when the power draw of the liquid pump sensed by the power sensor is below a second threshold;
    the circuitry configured to actuate the timer upon discontinuation of motive power to the liquid pump;
    the timer configured to discontinue the motive power to the liquid pump for a first wait time interval or a second wait time interval;
    the circuitry configured to actuate the liquid pump upon passing of the first wait time interval following the power sensor detecting the power draw of the liquid pump above the first threshold during a previous actuation of the liquid pump; and
    the circuitry configured to actuate the liquid pump upon passing of the second wait time interval following the power sensor detecting the power draw of the liquid pump above the first threshold during the previous actuation of the liquid pump.

2. The impeller sensor as recited in claim 1, wherein the liquid pump is an impeller pump having an electric motor and an impeller.

3. The impeller sensor as recited in claim 1, wherein the power sensor is mounted at a location remote from the liquid pump.

4. The impeller sensor as recited in claim 3, wherein the timer is mounted at the location remote from the liquid pump.

5. The impeller sensor as recited in claim 1, wherein the timer is mounted at a location remote from the liquid pump.

6. The impeller sensor as recited in claim 1, wherein the liquid pump is positioned in a bilge of a vessel.

7. The impeller sensor as recited in claim 6, wherein the vessel is a dry dock.

8. The impeller sensor as recited in claim 7, wherein the dry dock is a floating dry dock.

9. The impeller sensor as recited in claim 8, wherein the floating dry dock is inflatable.

\* \* \* \* \*